No. 822,476. PATENTED JUNE 5, 1906.
A. G. RAMAGE.
SPRING WHEEL.
APPLICATION FILED AUG. 28, 1905.

Witnesses.
K. H. Fenning
C. F. Early.

Inventor.
A. G. Ramage
By his attorneys
Baldwin & Wight

UNITED STATES PATENT OFFICE.

ALEXANDER GULLILAND RAMAGE, OF EDINBURGH, SCOTLAND, ASSIGNOR OF ONE-HALF TO GEORGE MACMILLAN, OF EDINBURGH, SCOTLAND.

SPRING-WHEEL.

No. 822,476.  Specification of Letters Patent.  Patented June 5, 1906.

Application filed August 28, 1905. Serial No. 276,037.

*To all whom it may concern:*

Be it known that I, ALEXANDER GULLILAND RAMAGE, shipbuilder, a subject of the King of Great Britain, residing at 8 Western Terrace, Murrayfield, Edinburgh, Scotland, have invented an Improved Spring-Wheel, of which the following is a specification.

This invention relates to a spring-wheel in which the hub and axle are free to move relatively to the rim, their motion being resisted by springs.

Figure 1:
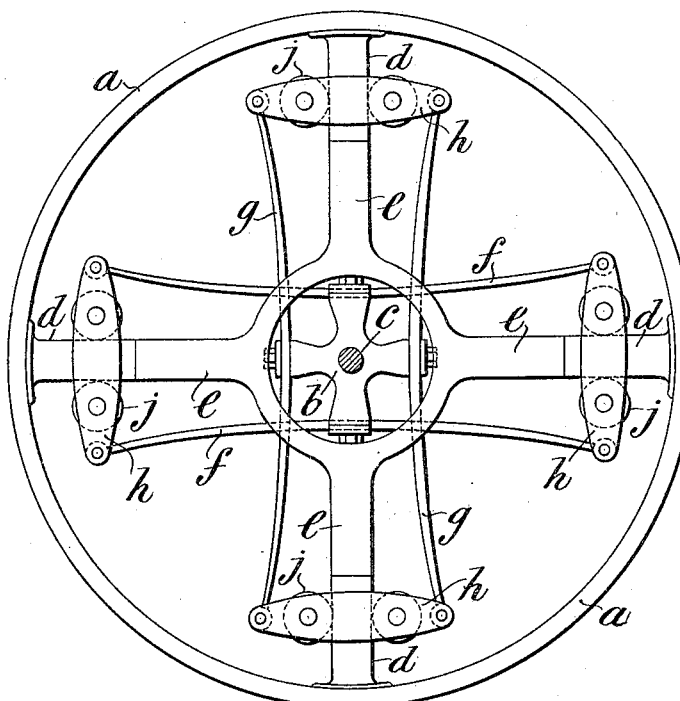
Figure 2:
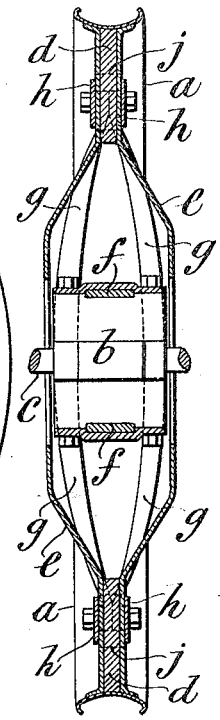
Figure 3:
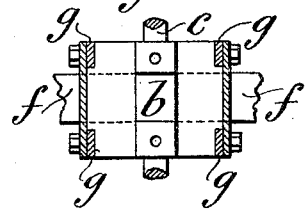

Figure 1 is a side elevation, and Fig. 2 a central section, of the wheel. Fig. 3 is a local section showing a detail.

$a$ is the rim, $b$ the hub, and $c$ the axle.

$d$ represents short spokes projecting inward from the rim and connected together by a pair of plates $e$, cut away in the center to allow of the movement of the axle. The hub $b$ is preferably in the form of a cross, as shown, and $f$ $g$ are springs fixed at their middles to the ends of the arms of the cross. The ends of the springs $f$ and $g$ are fixed to carriages $h$, free to move to and fro on the spokes $d$. The carriages $h$ consist of two side plates held apart by shoulder-bolts, which serve as the axles of rollers $j$ running on the spokes.

What I claim is—

1. The combination of a rim, spokes fixed to the rim, a hub, carriages running on the spokes and springs fixed to the hub and to the carriages.

2. The combination of a rim, spokes fixed to the rim, carriages, rollers mounted on the carriages and running on the spokes and springs having their middles fixed to the hub and their ends to the carriages.

ALEXANDER GULLILAND RAMAGE.

Witnesses:
AUGUSTUS E. INGRAM,
CARL FRIBERG.